United States Patent
Fahland et al.

(10) Patent No.: US 10,696,336 B2
(45) Date of Patent: Jun. 30, 2020

(54) ACTUATION SYSTEM HAVING A MAGNETORHEOLOGICAL DAMPER

(71) Applicant: GM GLOBAL TECHNOLOGY OPERATIONS LLC, Detroit, MI (US)

(72) Inventors: Jason D. Fahland, Fenton, MI (US); Joshua R. Auden, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 280 days.

(21) Appl. No.: 15/785,559

(22) Filed: Oct. 17, 2017

(65) Prior Publication Data
US 2019/0111981 A1   Apr. 18, 2019

(51) Int. Cl.
*B62D 37/02*   (2006.01)
*B62D 35/00*   (2006.01)
*F16F 9/53*    (2006.01)
*F16F 15/027*  (2006.01)

(52) U.S. Cl.
CPC ............ *B62D 37/02* (2013.01); *B62D 35/007* (2013.01); *F16F 9/535* (2013.01); *F16F 15/0275* (2013.01); *F16F 2222/06* (2013.01); *F16F 2228/066* (2013.01)

(58) Field of Classification Search
CPC ....... B62D 37/02; B62D 35/007; F16F 9/535; F16F 15/0275; F16F 2222/06; F16F 2228/066
USPC .......................................................... 701/49
See application file for complete search history.

(56) References Cited

U.S. PATENT DOCUMENTS

| | | | | |
|---|---|---|---|---|
| 4,635,991 A * | 1/1987 | Parno | ............... | B62D 35/007 296/180.1 |
| 4,647,069 A * | 3/1987 | Iijima | ............... | B60G 17/016 188/266.4 |
| 5,276,622 A * | 1/1994 | Miller | ............... | B60G 7/04 701/37 |
| 6,049,746 A * | 4/2000 | Southward | ............... | B60G 17/018 280/5.514 |
| 7,279,009 B2 * | 10/2007 | Herr | ............... | A61F 2/64 623/39 |
| 9,403,564 B1 * | 8/2016 | Al-Huwaider | ....... | B62D 35/007 |
| 9,776,675 B1 * | 10/2017 | Berger | ............... | B62D 35/007 |
| 2004/0124049 A1 * | 7/2004 | St. Clair | ............... | F16F 9/53 188/267.1 |
| 2005/0023052 A1 * | 2/2005 | Beck | ............... | B60K 7/0007 180/24.07 |

(Continued)

FOREIGN PATENT DOCUMENTS

| | | | |
|---|---|---|---|
| DE | 102015113347 A1 * | 7/2016 | |
| GB | 2424014 A * | 9/2006 | ............ F15B 20/002 |
| WO | WO-2004065147 A1 * | 8/2004 | ............ B60N 2/502 |

*Primary Examiner* — Khoi H Tran
*Assistant Examiner* — Jonathan J Pitts

(57) ABSTRACT

An automotive vehicle includes a body having an exterior surface and an aerodynamic member movably coupled to the exterior surface. The aerodynamic member has a first position with respect to the exterior surface and a second position with respect to the exterior surface. The first position presents a distinct aerodynamic profile from the second position. The vehicle additionally includes an actuator coupled to the aerodynamic member and configured to actuate the aerodynamic member between the first position and the second position. The vehicle further includes a damper coupled to the aerodynamic member. The damper is provided with magnetorheological fluid.

15 Claims, 3 Drawing Sheets

(56) References Cited

U.S. PATENT DOCUMENTS

| | | | |
|---|---|---|---|
| 2006/0124413 A1* | 6/2006 | Namuduri | B60G 17/0152 188/267 |
| 2008/0309122 A1* | 12/2008 | Smith | B62D 35/001 296/180.1 |
| 2009/0178397 A1* | 7/2009 | Mankame | F15B 21/045 60/329 |
| 2010/0126716 A1* | 5/2010 | Joseph | E21B 23/00 166/244.1 |
| 2011/0084516 A1* | 4/2011 | Smith | B62D 35/001 296/180.4 |
| 2013/0134712 A1* | 5/2013 | Rodriguez Tsouroukdissian | F03D 7/0296 290/44 |
| 2013/0240320 A1* | 9/2013 | Browne | F03G 7/065 192/84.9 |
| 2014/0019010 A1* | 1/2014 | Smith | G05D 3/00 701/49 |
| 2014/0079548 A1* | 3/2014 | Rodriguez Tsouroukdissian | F03D 80/00 416/85 |
| 2014/0249720 A1* | 9/2014 | Sintorn | B62K 21/08 701/41 |
| 2015/0136006 A1* | 5/2015 | Rodriguez Tsouroukdissian | B63B 35/44 114/121 |
| 2015/0165860 A1* | 6/2015 | Soles | B60G 13/06 280/6.157 |
| 2015/0232138 A1* | 8/2015 | Parry-Williams | G05D 3/00 296/180.5 |
| 2016/0033053 A1* | 2/2016 | Battlogg | F16K 31/0675 251/129.01 |
| 2016/0052431 A1* | 2/2016 | Barnard | B60N 2/02 701/36 |
| 2016/0265617 A1* | 9/2016 | Lee | F16F 9/535 |
| 2016/0297477 A1* | 10/2016 | Auden | B62D 37/02 |
| 2016/0325821 A1* | 11/2016 | Golshany | B64C 1/26 |
| 2017/0137075 A1* | 5/2017 | Povinelli | B62D 35/008 |

* cited by examiner

ACTUATION SYSTEM HAVING A MAGNETORHEOLOGICAL DAMPER

TECHNICAL FIELD

The present disclosure relates to automotive vehicles, and more particularly to aerodynamic control systems for automotive vehicles.

INTRODUCTION

As an automotive vehicle travels, it disturbs the air through which it passes. This air disturbance has an impact on energy consumption of the automotive vehicle, among other factors. Overcoming wind resistance and turbulence generated by the passage of the vehicle expends energy, which must be obtained from fuel, electricity, or other stored energy of the vehicle. The greater the wind resistance and turbulence, the greater the expenditure of fuel and the lower the fuel economy. Vehicles are therefore generally designed with aerodynamic performance in mind. In conventional vehicle design aerodynamic features were generally fixed body structures on the exterior of the vehicle. However, recently, actively movable aerodynamic features have been implemented on some vehicles. Known methods for controlling end-of-travel speed and position of such features generally include friction-based clutches, which are relatively complex and weighty systems which deteriorate over time.

SUMMARY

An automotive vehicle according to the present disclosure includes a body having an exterior surface and an aerodynamic member movably coupled to the exterior surface. The aerodynamic member has a first position with respect to the exterior surface and a second position with respect to the exterior surface. The first position presents a distinct aerodynamic profile from the second position. The vehicle additionally includes an actuator coupled to the aerodynamic member and configured to actuate the aerodynamic member between the first position and the second position. The vehicle further includes a damper coupled to the aerodynamic member. The damper is provided with magnetorheological fluid.

In an exemplary embodiment, the vehicle additionally includes a magnetic field generator and at least one controller. The at least one controller is configured to control the magnetic field generator to modify viscosity of the magnetorheological fluid. The at least one controller may be further configured to, in response to an actuation operating condition being satisfied, control the magnetic field generator to reduce viscosity of the magnetorheological fluid and control the actuator to move the aerodynamic member from the first position to the second position. The at least one controller may be further configured to, in response to the actuator moving from the first position to the second position and being at an intermediate position between the first position and the second position, control the magnetic field generator to increase viscosity of the magnetorheological fluid. The at least one controller may be further configured to, in response to the actuator being actuated to the second position, control the magnetic field generator to further increase viscosity of the magnetorheological fluid. The intermediate position may corresponds to 90% actuation from the first position to the second position.

In an exemplary embodiment, the aerodynamic member includes an airfoil coupled to an aft portion of the exterior surface.

A method of controlling an automotive vehicle according to the present disclosure includes providing a first component and a second component. The first component is movably coupled to the second component. The method also includes providing an actuator coupled to the second component and configured to actuate the second component between a first position and a second position with respect to the first component. The method additionally includes providing a damper coupled to the first component and the second component. The damper is provided with magnetorheological fluid and includes a magnetic field generator. The method further includes providing at least one controller in communication with the actuator and the magnetic field generator. The method further includes, in response to an actuation operating condition being satisfied, automatically controlling the magnetic field generator, via the at least one controller, to reduce viscosity of the magnetorheological fluid and automatically controlling the actuator, via the at least one controller, to move the second component from the first position to the second position.

In an exemplary embodiment, the method additionally includes, in response to the actuator moving the second component from the first position to the second position and being at an intermediate position between the first position and the second position, automatically controlling the magnetic field generator, via the at least one controller, to increase viscosity of the magnetorheological fluid. Such embodiments may additionally include, in response to the second component being actuated to the second position, automatically controlling the magnetic field generator, via the at least one controller, to further increase viscosity of the magnetorheological fluid. The intermediate position may correspond to 90% actuation from the first position to the second position.

In an exemplary embodiment, the second component includes an airfoil and the first component includes a body structure of an automotive vehicle.

An assembly for an automotive vehicle according to the present disclosure includes a first component and a second component. The second component is movably coupled to the first component. The second component has a first position and a second position with respect to the first component. The assembly also includes an actuator coupled to the second component and configured to actuate the second component between the first position and the second position. The assembly additionally includes a damper coupled to the first component and the second component. The damper is provided with magnetorheological fluid and includes a magnetic field generator. The assembly further includes at least one controller in communication with the actuator and the magnetic field generator. The controller is configured to, in response to an actuation operating condition being satisfied, automatically control the magnetic field generator to reduce viscosity of the magnetorheological fluid and control the actuator to move the second component from the first position to the second position.

In an exemplary embodiment the controller is further configured to, in response to the actuator moving the second component from the first position to the second position and being at an intermediate position between the first position and the second position, automatically control the magnetic field generator to increase viscosity of the magnetorheological fluid. In such embodiments, the controller may be further configured to, in response to the second component being actuated to the second position, automatically control the magnetic field generator to further increase viscosity of the magnetorheological fluid. The intermediate position may correspond to 90% actuation from the first position to the second position.

In an exemplary embodiment, the second component includes an airfoil and the first component includes a body structure of an automotive vehicle.

Embodiments according to the present disclosure provide a number of advantages. For example, system and methods according to the present disclosure may enable tuning motion of an actuator in a system, e.g. an aerodynamic control system, by tuning damping characteristics of the system via an MR damper. Moreover, the MR damper may function to maintain the system at a desired setting, e.g. an aerodynamic member at a desired position. Embodiments according to the present disclosure may thereby reduce wear and tear of components in the system relative to known solutions.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
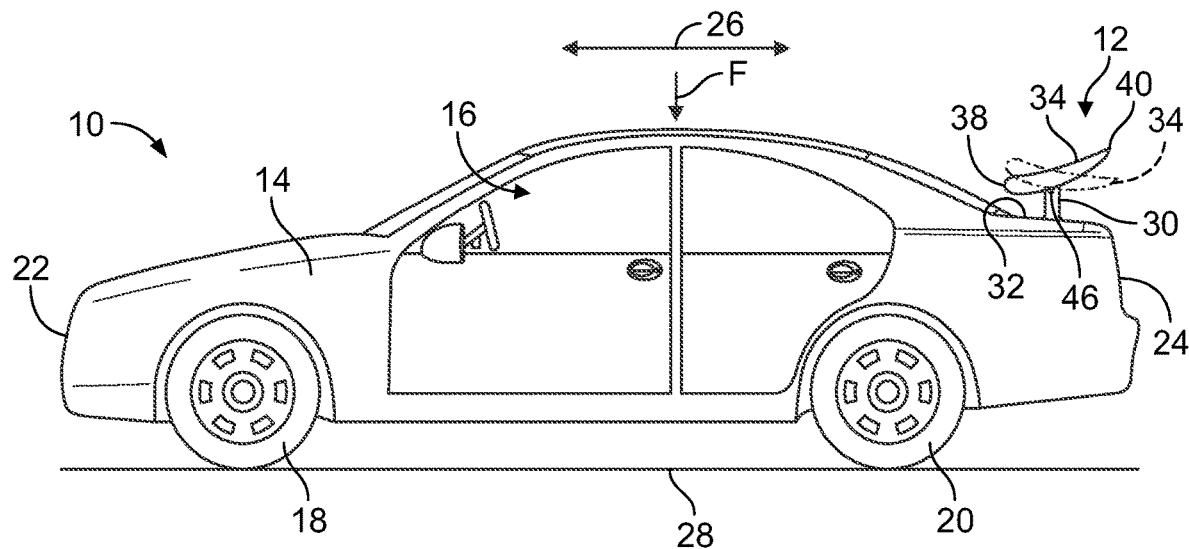
FIG. 1 is an illustration of a vehicle according to an embodiment of the present disclosure.

Referring now to FIG. 1, an automotive vehicle 10 having an aerodynamic control system 12 according to the present disclosure is illustrated. The vehicle 10 include a body structure or vehicle body 14. The aerodynamic control system 12 is coupled to the vehicle body 14. While depicted in FIG. 1 as a rear wing coupled to an aft portion of the body 14, in other embodiments the aerodynamic control system 12 may include other types of aerodynamic members such as active front deflectors or other movable aerodynamic surfaces. Additionally, the vehicle body 14 includes a passenger compartment 16. Generally, one or more occupants can be disposed in the passenger compartment 16. The passenger compartment 16 may be provided with one or more doors that open and close to allow the occupants to enter and exit the vehicle 10.

The vehicle body 14 includes a fore portion 22 and an aft portion 24, with a plurality of fascia pieces or panels, some or all of which are visible from the outside of the passenger compartment 16 of the vehicle 10. The fore and aft portions 22, 24 are spaced from each other along a longitudinal direction (see double arrow 26 in FIG. 1) of the vehicle 10. Generally, the fascia pieces or panels surround the vehicle 10. The vehicle 10 can also include one or more wheels (i.e., front wheels 18 and rear wheels 20).

The fascia pieces or panels can include one or more of: a front panel which can include a front bumper fascia, a rear panel which can include a rear bumper fascia, and side panel(s) which can include front quarter panel fascia(s) and rear quarter panel fascia(s). FIG. 1 illustrates one side of the vehicle 10, and the other side of the vehicle 10 may be generally a mirror image of the illustrated side. The sides of the vehicle 10 are spaced from each other in a lateral direction. The lateral direction is transverse or perpendicular to the longitudinal (as indicated by double arrow 26) of the vehicle 10. Generally, the front bumper fascia can be disposed along the fore portion 22 of the vehicle 10, and the rear bumper fascia can be disposed along the aft portion 24 of the vehicle 10. Therefore, the front quarter panel fascia(s) can be disposed adjacent to the front bumper fascia and the rear quarter panel fascia(s) can be disposed adjacent to the rear bumper fascia.

Figure 2:
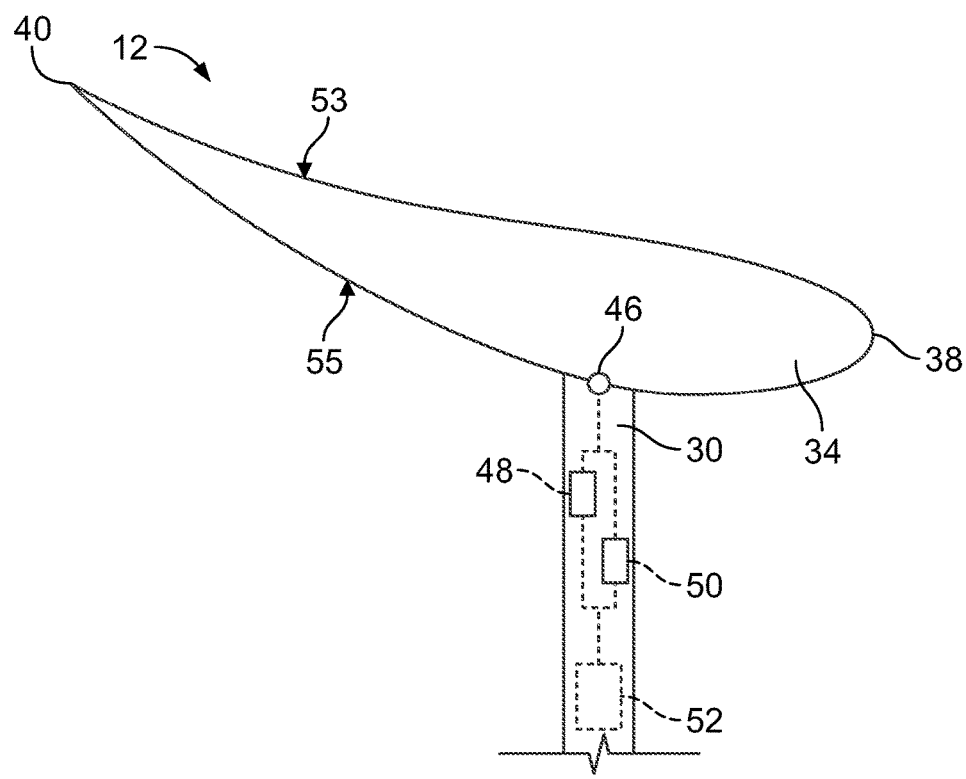
FIG. 2 is a schematic representation of an aerodynamic control system according to an embodiment of the present disclosure.

Referring to FIGS. 1 and 2, the aerodynamic control system 12 includes a support structure 30 coupled to a component. In the embodiment illustrated in FIGS. 1 and 2, the support structure 30 includes a stanchion coupled to a top 32 of the aft portion 24, e.g. a trunk lid. However, in other embodiments the support structure 30 may include other types of structures, structures coupled to other components, or a combination thereof. The support structure 30 is fixed to the component by any suitable method, including fastener(s), welding, adhesive, coupler(s), press fit, interference fit, other fixing methods, or combinations thereof. As non-limiting examples of other embodiments, the support structure 30 can be one or more posts and/or part of the vehicle body 14 such as a front bumper.

Continuing with FIGS. 1 and 2, the aerodynamic control system 12 also includes at least one aerodynamic member 34 supported by the support structure 30. In the embodiment illustrated in FIGS. 1 and 2, the aerodynamic member 34 is configured as a wing-shaped spoiler. "Wing-shaped" as used herein refers to an object having a shape of a wing, i.e., a fin having an airfoil shape defined by a streamlined cross-sectional shape configured to produce lift or downforce. The term "spoiler" means an aerodynamic device capable of disrupting air movement across the vehicle body 14 while the vehicle 10 is in motion, thereby reducing drag and/or inducing an aerodynamic downforce F on the vehicle 10. The term "downforce" means a force component that is perpendicular to the direction of relative motion of the vehicle 10, i.e., in the longitudinal direction, toward the road surface 28. The aerodynamic member 34 may be formed from a suitably rigid but low mass material, such as an engineered plastic or aluminum, for structural stability. The aerodynamic member 34 is movable between a first position relative to the support structure 30 and a second position relative to the support structure 30. FIG. 1 illustrates examples of two different positions of the aerodynamic member 34, one in solid lines and one in phantom lines for illustrative purposes only. It is to be appreciated that the aerodynamic member 34 can move in other positions than illustrated.

An airflow can pass across the aerodynamic member 34 as the vehicle 10 travels across the road surface 28. Depending on the position of the aerodynamic member 34, the airflow can be changed, which may change aerodynamic characteristics of the vehicle 10. For example, the aerodynamic member 34 is movable to change an aerodynamic downforce F applied to the vehicle 10 as the vehicle 10 travels across the road surface 28. The aerodynamic member 34 can be configured such that the airflow passes over only one surface of the aerodynamic member 34, e.g. a pressure surface 53, relative to the road surface 28, or alternatively, the aerodynamic member 34 can be configured such that the airflow passes over both surfaces of the aerodynamic member 34, e.g. the pressure surface 53 and a suction surface 55, relative to the road surface 28.

In various embodiments considered within the scope of the present disclosure, the aerodynamic member 34 can include one or more of a spoiler or a wing disposed at any location along a top of the vehicle 10, a dive wing disposed at any location along a corner of the vehicle 10, a gurney flap disposed at any location along the fore portion 22 of the vehicle 10 or disposed on a spoiler, a front splitter disposed at any location along the fore portion 22 of the vehicle 10, a front air dam disposed at any location along the fore portion 22 of the vehicle 10, other aerodynamic members, or combination thereof. Each of the aerodynamic members 34 can include one or more of the features discussed herein for the single aerodynamic member 34.

The aerodynamic member 34 can includes a first end 38 and a second end 40 spaced from each other. In the embodiment illustrated in FIG. 1, the first end 38 may be referred to as a leading edge and the second end 40 may be referred to as a trailing edge. Depending on the function of the aerodynamic member 34 for a given embodiment, the first end 38 of the aerodynamic member 34 can be disposed closer to the passenger compartment 16 than the second end 40 of the aerodynamic member 34 or vice-versa. The aerodynamic member 34 may be an elongated member having a span extending in a generally lateral direction, i.e. perpendicular to the longitudinal direction 26.

The aerodynamic control system 12 includes a pivot point 46 coupled to the aerodynamic member 34 to allow the aerodynamic member 34 to move between the first and second positions. In certain embodiments, the pivot point 46 can be disposed between the first and second ends 38, 40 of the aerodynamic member 34. For example, as shown in FIG. 1, the aerodynamic member 34 includes the pivot point 46 between the first and second ends 38, 40. In other embodiments, the pivot point 46 can be disposed at one of the first and second ends 38, 40 of the aerodynamic member 34. For example, an active underbody air deflector may include a pivot point 46 disposed at the first end 38.

The aerodynamic control system 12 further includes an actuator 48 coupled to the aerodynamic member 34. The actuator 48 is configured to move the aerodynamic member 34 between the first and second positions. The actuator 48 can be coupled to the aerodynamic member 34 in any suitable location to move the aerodynamic member 34 between the positions. In certain embodiments, the actuator 48 can be disposed inside or outside of the support structure 30. In other embodiments, the actuator 48 can be coupled or attached to the vehicle body 14. In yet other embodiments, the actuator 48 can be disposed inside the aerodynamic member 34. The actuator 48 can include a motor, a solenoid, an arm and/or any other suitable apparatus to move the aerodynamic member 34 to the desired position.

Figure 3:
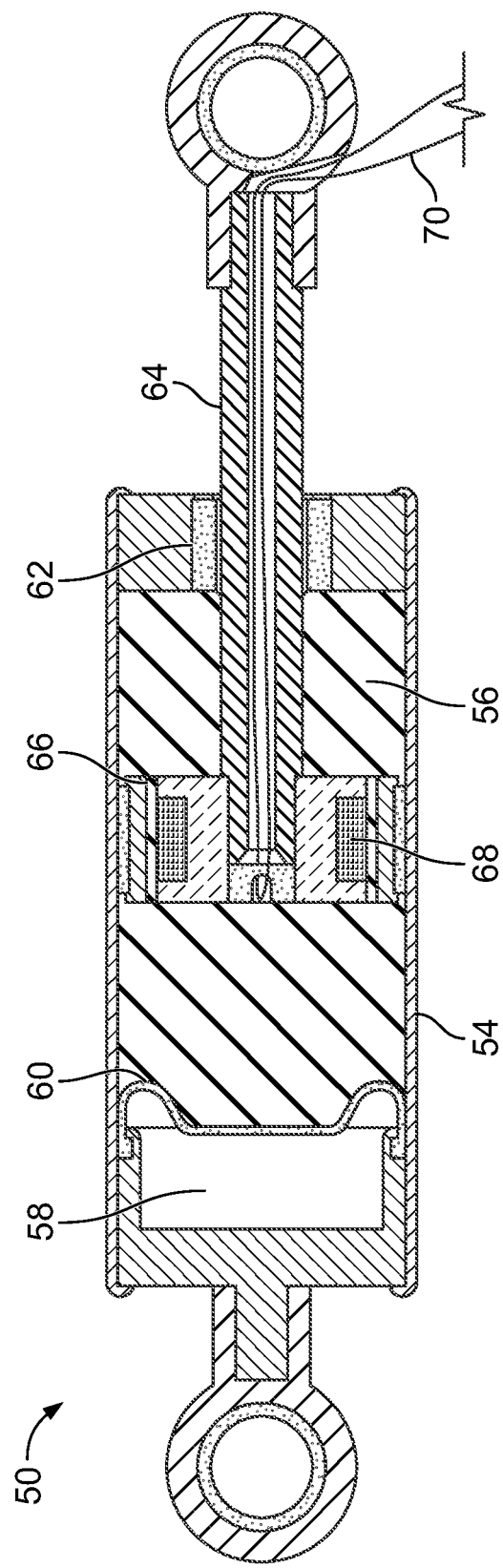
FIG. 3 is a schematic representation of a magnetorheological damper according to an embodiment of the present disclosure.

The aerodynamic control system 12 further includes a magnetorheological ("MR") damper 50 coupled to the aerodynamic member 34. Various designs of MR dampers are known. An exemplary MR damper 50 is illustrated in FIG. 3; however, any known MR damper design may be implemented in embodiments according to the present disclosure.

The MR damper 50 includes a housing 54 filled with a quantity of MR fluid 56. MR fluid generally consists of a carrier fluid such as oil, water, or glycol, provided with ferrous particles such as carbonyl iron. The housing 50 has a closed end provided with an accumulator 58 and a diaphragm 60 and an open end provided with an annular seal 62. A piston 64 passes through the seal 62 and is retained at least partially within the housing 54 and arranged to slide relative to the housing 54. The diaphragm 60 and accumulator 58 are provided to accommodate changes in volume arising due to sliding motion of the piston 64. A fluid orifice 66 is provided through a head of the piston 64, such that MR fluid 56 may pass through the orifice 66 as the piston 64 slides relative to the housing 54. An electromagnetic coil 68 is provided on the head of the piston 64 and coupled to electrodes 70.

When the electrodes 70 are energized, current is supplied to the coil 68 and a magnetic field is thereby generated. In response to the magnetic field, ferrous particles in the MR fluid 56 are aligned and the viscosity of the MR fluid 56 is increased. The extent to which the ferrous particles in the MR fluid 56 are aligned, and hence the viscosity of the MR fluid 56, may be varied by modifying the current applied to the electrodes 70. The MR damper 50 thereby provides a controllable quantity of damping force, resisting motion of the piston 64.

The MR damper 50 is coupled between the aerodynamic member 34 and a component which is fixed relative to the body 14, e.g. the support structure 30, to thereby provide a controllable damping force resisting motion of the aerodynamic member 34 relative to the body 14.

The actuator 48 and MR damper 50 are under the control of a controller 52. While depicted as a single unit, the controller 52 may include one or more additional controllers collectively referred to as a "controller." The controller 52 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 52 is programmed to control the actuator 48 to move the aerodynamic member 34 between the first and second positions in response to satisfaction of various operating conditions. As an example, the controller 52 may be programmed to control the actuator 48 to move the aerodynamic member 34 to increase downforce in response to a turning operating condition being satisfied.

Furthermore, the controller 52 is programmed to control the MR damper 50, as will be discussed in further detail below with respect to FIG. 4. Briefly speaking, the controller 52 may selectively control the MR damper 50 to modify damping force as desired, e.g. by energizing or de-energizing the electrodes 70.

Figure 4:
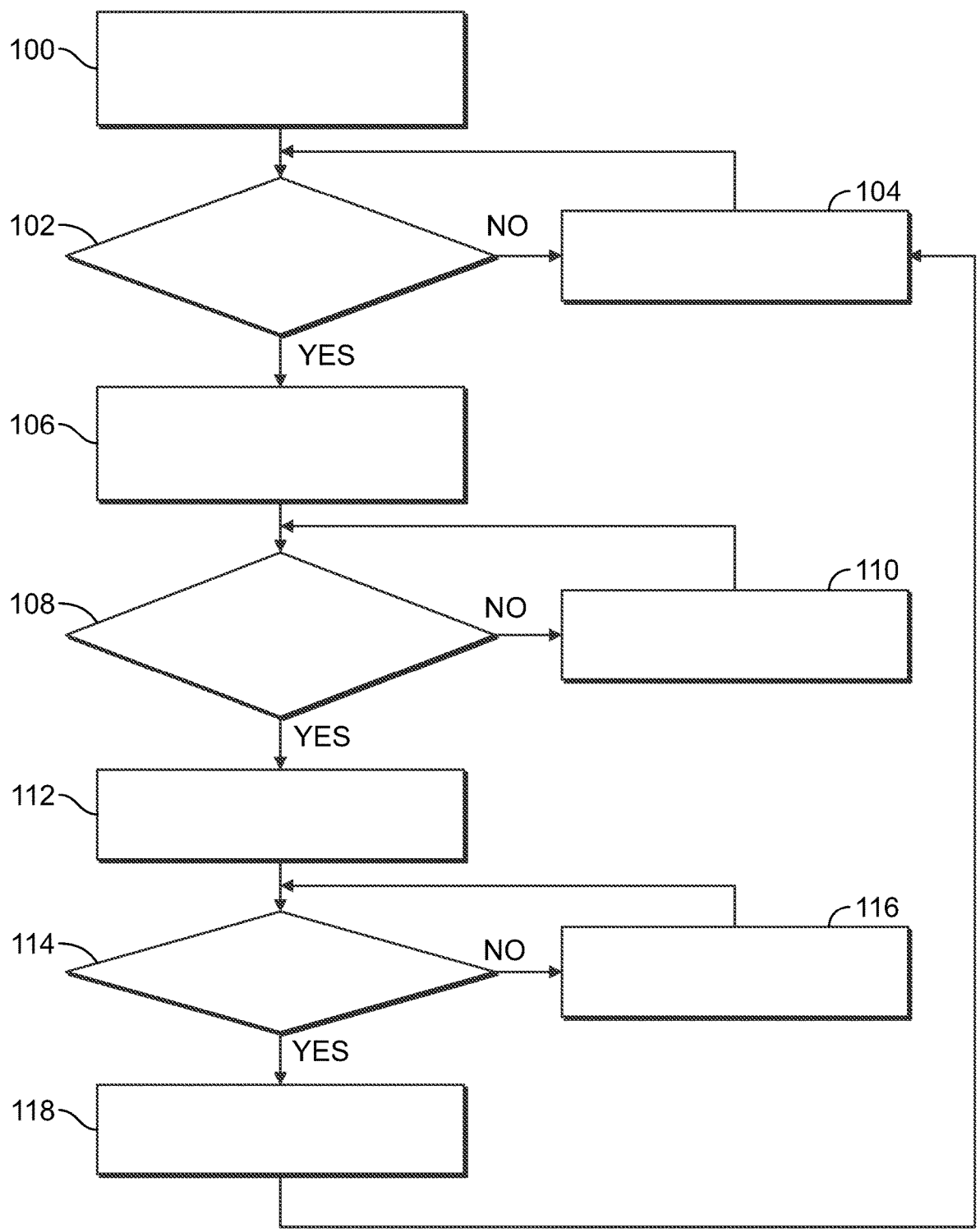
FIG. 4 is a flowchart representation of a method of controlling an aerodynamic control system according to an embodiment of the present disclosure.

Referring now to FIG. 4, a method of controlling an aerodynamic control system according to the present disclosure is illustrated in flowchart form. In an exemplary embodiment, the aerodynamic control system is arranged generally similar to that illustrated in FIGS. 1-3, and the algorithm illustrated in FIG. 4 is performed by a controller generally similar to the controller 52.

An actuator for the aerodynamic control system is deployed to an initial setting, as illustrated at block 100. Optionally, an MR damper associated with the aerodynamic control system is energized to maintain a position of an aerodynamic member of the aerodynamic control system, as also illustrated at block 100.

A determination is made of whether an actuation operating condition is satisfied, as illustrated at operation 102. As a non-limiting example, the actuation operating condition may correspond to a determination that the vehicle is undergoing a turning maneuver, or any other operating condition in which actuation of an aerodynamic member is desirable.

If the determination of operation 102 is negative, the actuator is maintained at a current setting, as illustrated at block 104. Control then returns to operation 102. The actuator is thereby maintained at the current setting unless and until an actuation operating condition is satisfied.

If the determination of operation 102 is positive, then the MR damper is de-energized to permit motion of the aerodynamic member, and the actuator control to the new setting is initiated, as illustrated at block 106. Depending on the configuration of the actuator and the magnitude of the actuation, full actuation to the new setting may be accomplished on the order of 0.5 seconds.

A determination is made of whether the actuator is within a predefined threshold of the new setting, as illustrated at block 108. In an exemplary embodiment, the predefined threshold corresponds to the actuator being at least 90% complete, i.e. within 10% of the new setting. This determination may be made based on a reading from a sensor associated with the actuator, the aerodynamic member, or both. In an exemplary embodiment where the actuator includes an electric motor, the determination may be made based on an encoder associated with the motor.

If the determination of operation 108 is negative, then the actuator continues to be controlled to the new setting for a current cycle, as illustrated at block 110. Control then returns to operation 108 for a subsequent evaluation.

If the determination of operation 108 is positive, then the MR damper is partially energized, as illustrated at block 112. In an exemplary embodiment, the MR damper is energized with 25% of a maximum MR damper current. Viscosity of the MR fluid is thereby increased, increasing resistance to motion of the aerodynamic member and providing for a softer arrival in the final position of the aerodynamic member upon completion of the current actuation.

A determination is made of whether the current actuation is complete, i.e. whether the actuator has arrived at the new setting, as illustrated at block 114. If the determination of operation 114 is negative, then the actuator continues to be controlled to the new setting for a current cycle, as illustrated at block 116. Control then returns to operation 114 for a subsequent evaluation.

If the determination of operation 114 is positive, then the MR damper is fully energized, as illustrated at block 118. In an exemplary embodiment, the MR damper is energized with the maximum MR damper current to maintain the aerodynamic member in the current position. Control then returns to block 104.

Variations of the above are, of course, possible. As an example, similar combinations of actuator and MR damper may be used to provide fine-tuned control of other movable components in a vehicle.

In various embodiments according to the present disclosure, the aerodynamic control system can be utilized in a vehicle application or a non-vehicle application. Non-limiting examples of vehicular embodiments include cars, racing vehicles, trucks, off-road vehicles, motorcycles, aircrafts, farm equipment or any other suitable movable platform. Vehicular embodiments may include autonomously driven vehicles or conventional human-controlled vehicles. Non-limiting examples of the non-vehicular embodiments include machines, farm equipment or any other suitable non-vehicle device.

As may be seen, embodiments according to the present disclosure provides a system and method for tuning motion of an actuator in a system, e.g. an aerodynamic control system, by tuning damping characteristics of the system via an MR damper. Moreover, the MR damper may function to maintain the system at a desired setting, e.g. an aerodynamic member at a desired position. Embodiments according to the present disclosure may thereby reduce wear and tear of components in the system relative to known solutions.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a body having an exterior surface;
an aerodynamic member movably coupled to the exterior surface, the aerodynamic member having a first position with respect to the exterior surface and a second position with respect to the exterior surface, the first position presenting a distinct aerodynamic profile from the second position;
an actuator coupled to the aerodynamic member and configured to actuate the aerodynamic member between the first position and the second position;
a damper, separate from the actuator, coupled to the aerodynamic member, the damper being provided with magnetorheological fluid;
a magnetic field generator operable at a plurality of energy states including a first energy state and a second energy state; and
at least one controller, the at least one controller being configured to control the energy state of the magnetic field generator to modify viscosity of the magnetorheological fluid, the first energy state being associated with a higher viscosity than the second energy state, wherein the at least one controller is further configured to, in response to an actuation operating condition being satisfied, control the energy state of the magnetic field generator from the first energy state to the second energy state to reduce viscosity of the magnetorheological fluid and control the actuator to move the aerodynamic member from the first position to the second position, wherein the actuator control to move the aerodynamic member from the first position to the second position is initiated with the magnetic field generator in the second energy state.

2. The automotive vehicle of claim 1, wherein the at least one controller is further configured to, in response to the actuator moving from the first position to the second position and being at an intermediate position between the first position and the second position, control the magnetic field generator to increase viscosity of the magnetorheological fluid.

3. The automotive vehicle of claim 2, wherein the at least one controller is further configured to, in response to the actuator being actuated to the second position, control the magnetic field generator to further increase viscosity of the magnetorheological fluid.

4. The automotive vehicle of claim 2, wherein the intermediate position corresponds to 90% actuation from the first position to the second position.

5. The automotive vehicle of claim 1, wherein the aerodynamic member includes an airfoil coupled to an aft portion of the exterior surface.

6. A method of controlling an automotive vehicle, comprising:
providing a first component and a second component, the first component being movably coupled to the second component;
providing an actuator coupled to the second component and configured to actuate the second component between a first position and a second position with respect to the first component;
providing a damper coupled to the first component and the second component, the damper being provided with magnetorheological fluid and including a magnetic field generator, the magnetic field generator being operable at a plurality of energy states including a first energy state and a second energy state, the first energy state being associated with a higher viscosity of the magnetorheological fluid than the second energy state;
providing at least one controller in communication with the actuator and the magnetic field generator; and
in response to an actuation operating condition being satisfied, automatically controlling the magnetic field generator, via the at least one controller, from the first energy state to the second energy state to reduce viscosity of the magnetorheological fluid and automatically controlling the actuator, via the at least one controller, to move the second component from the first position to the second position, wherein the automatically controlling the actuator is initiated with the magnetic field generator in the second energy state.

7. The method of claim 6, further comprising, in response to the actuator moving the second component from the first position to the second position and being at an intermediate position between the first position and the second position, automatically controlling the magnetic field generator, via the at least one controller, to increase viscosity of the magnetorheological fluid.

8. The method of claim 7, further comprising, in response to the second component being actuated to the second position, automatically controlling the magnetic field generator, via the at least one controller, to further increase viscosity of the magnetorheological fluid.

9. The method of claim 7, wherein the intermediate position corresponds to 90% actuation from the first position to the second position.

10. The method of claim 6, wherein the second component includes an airfoil and the first component includes a body structure of an automotive vehicle.

11. An assembly for an automotive vehicle comprising:
a first component;
a second component movably coupled to the first component, the second component having a first position and a second position with respect to the first component;
an actuator coupled to the second component and configured to actuate the second component between the first position and the second position;
a damper, separate from the actuator, coupled to the first component and the second component, the damper being provided with magnetorheological fluid and including a magnetic field generator, the magnetic field generator being operable at a plurality of energy states including a first energy state and a second energy state, the first energy state being associated with a higher viscosity of the magnetorheological fluid than the second energy state; and
at least one controller in communication with the actuator and the magnetic field generator, the at least one controller being configured to, in response to an actuation operating condition being satisfied, automatically control the magnetic field generator from the first energy state to the second energy state to reduce viscosity of the magnetorheological fluid and control the actuator to move the second component from the first position to the second position, wherein the actuator control to move the second component from the first position to the second position is initiated with the magnetic field generator in the second energy state.

12. The assembly of claim 11, wherein the at least one controller is further configured to, in response to the actuator moving the second component from the first position to the second position and being at an intermediate position between the first position and the second position, automatically control the magnetic field generator to increase viscosity of the magnetorheological fluid.

13. The assembly of claim 12, wherein the at least one controller is further configured to, in response to the second component being actuated to the second position, automatically control the magnetic field generator to further increase viscosity of the magnetorheological fluid.

14. The assembly of claim 12, wherein the intermediate position corresponds to 90% actuation from the first position to the second position.

15. The assembly of claim 11, wherein the second component includes an airfoil and the first component includes a body structure of an automotive vehicle.

* * * * *